(12) United States Patent
Ito

(10) Patent No.: US 7,391,581 B2
(45) Date of Patent: Jun. 24, 2008

(54) LENS BARREL

(75) Inventor: Masaki Ito, Saitama (JP)

(73) Assignee: Fujinon Corporation, Saitama (JP)

( * ) Notice: Subject to any disclaimer, the term of this patent is extended or adjusted under 35 U.S.C. 154(b) by 7 days.

(21) Appl. No.: 11/519,835

(22) Filed: Sep. 13, 2006

(65) Prior Publication Data

US 2007/0058271 A1 Mar. 15, 2007

(30) Foreign Application Priority Data

Sep. 14, 2005 (JP) ............................. 2005-267251

(51) Int. Cl.
*G02B 7/02* (2006.01)
(52) U.S. Cl. .................... 359/811; 359/819; 359/827
(58) Field of Classification Search .......... 359/808–830
See application file for complete search history.

(56) References Cited

U.S. PATENT DOCUMENTS 5,249,082 A * 9/1993 Newman .................... 359/813

2007/0146905 A1 * 6/2007 Kuroda ....................... 359/811

FOREIGN PATENT DOCUMENTS

| JP | 10-319291 | 12/1998 |
| JP | 2002-350702 | 12/2002 |
| JP | 2004-212822 | 7/2004 |
| JP | 2005-49599 | 2/2005 |

* cited by examiner

*Primary Examiner*—Mohammed Hasan
(74) *Attorney, Agent, or Firm*—Young & Thompson

(57) ABSTRACT

A lens barrel for holding an optical lens system including a molded plastic lens having decentering eccentricity is provided with a location and joining mechanism that places the plastic lens with a desired axial position with an optical axis coaxial with a geometric axis and secures the plastic lens to the barrel. The locating and joining mechanism includes three axial projections extending from the plastic lens at regular intervals on a circle with a specified radius and three groups of locating members, each group including three sets of axial bores in the barrel disposed at regular intervals on a circle with the specified radius. The bores of a set have equal depth. Each set has a different depth. Circles of the locating members have different centers. The projections are fitted in the bores selected for axial position adjustment of the lens and selected for coaxial adjustment of the lens.

4 Claims, 4 Drawing Sheets

LENS BARREL

BACKGROUND OF THE INVENTION

1. Field of the Invention

The present invention relates to a lens barrel of a type capable of fixedly holding a plastic lens in a location where the plastic lens is placed in a desired axial position and an optical axis of the plastic lens is substantially coaxial with a geometric axis of the lens barrel.

2. Description of Related Art

There has been known a projector equipped with a projection lens system for enlarging and projecting an image modulated by an image display element on a remote screen The projection lens system is capable of changing its magnification power by shifting an axial position of a front lens (a distance between a front lens and a neighboring lens). Since it is common to use a super-wide-angle lens for the front lens, a plastic lens, that can be comparatively easily manufactured at low costs by molding even though it is complicated in shape, is often used for the front lens.

Conventionally, in incorporating the projection lens system in a lens barrel, the front lens is adjusted in an axial position by inserting a spacer having an appropriate thickness, which is selected from spacers different in thickness, between a back face of the front lens and a bearing wall of the lens barrel. However, it is troublesome and expensive to always have a stock of various thickness of spacers ready.

In order to skirt around this advantage, it has been proposed in Unexamined Japanese Patent Publication Nos. 2002-350702, 2004-212822 and 2005-49599 to adjust an axial position of a lens element by selectively using a plurality of shoulders different in axial position which are formed in either one of the lens element or a lens holder for the lens element and a bearing wall of a lens barrel. Further, it has been proposed in Unexamined Japanese Patent Publication No. 10-319291 to incorporate an adjuster ring having locating means between a back face of a lens element and a bering wall of a lens barrel. The locating means comprises a plurality of axial projections extending from the back of the lens element and a multiple sets of locating recesses different in axial depth by set so that when placing the lens element in a desired axial position in the lens barrel, the adjuster ring is turned so as to receive the axial projections by an appropriate set of locating recesses having an appropriate axial depth.

Meanwhile, injection molding is commonly used to manufacture plastic lenses. However, the problem encountered by such a plastic lens is that a molded plastic lens possibly has eccentricity, i.e. a deviation of a geometric axis decentered from an optical axis of the plastic lens, due to dimensional differences of the molded plastic lens from a design specification which occur depending upon marginal production accuracy of a molding die. In particular, when using a multi-molding die having a plurality of molding cavities, plastic lenses molded by the multi-molding die are apt to have eccentricity different from one another according to the molding cavities.

When incorporating such a plastic lens having eccentricity into a lens barrel, the problem encountered by the plastic lens is that it is hard to bring an optical axis of the plastic lens almost coaxial with a geometric axis of the lens barrel in the case where the technique of axial lens position adjustment described in Unexamined Japanese Patent Publication No. 2004-212822 or No. 10-319291, or that, it is possible but somewhat troublesome to bring an optical axis of the plastic lens almost coaxial with a geometric axis of the lens barrel in despite of the capability of axial adjustment in the case where the technique of axial position adjustment of a lens described in Unexamined Japanese Patent Publication No. 2002-350702 or No. 2005-49599 2004-212822. In addition, since it is essential to fixedly hold the plastic lens in the lens barrel with an adhesive, it is hard to remove the plastic lens from the lens barrel after having been incorporated in the lens barrel once. If using a projection lens system including a lens element whose optical axis remains decentered from a geometric axis of a lens barrel, the projection lens system entails quality deterioration of an image projected thereby.

SUMMARY OF THE INVENTION

It is therefore an object of the present invention to provide a lens barrel which is capable of adjusting an axial position of a plastic lens, and besides practically counteracting the effect of eccentricity of the plastic lens while lens barrel is manufactured at a reduced cost while.

The foregoing object of the present invention are accomplished by a lens barrel for holding an optical lens system including a plastic lens which is formed by molding and ends up having eccentricity, i.e. a deviation of an optical axis from a geometric axis thereof, due to a manufacturing error entailed by a molding die used for molding the plastic lens. The lens barrel comprises a lens holding barrel for fixedly holding the plastic lens therein and locating and joining means for placing the plastic lens in an appropriate location where the plastic lens is in an appropriate axial position and the optical axis of the plastic lens is appropriately coaxial with a geometric axis of the lens holding barrel and fixedly joining the plastic lens to the lens holding barrel in the appropriate location. The locating and joining means comprises at least three axial projections of predetermined equal axial length which extend in an axial direction from a marginal portion of the plastic lens and are disposed at regular angular intervals on a circumference of a circle with a specified radius, and at least two groups of locating means comprising axial bores for receiving the axial projections respectively, each locating means comprising at least two sets of the axial bores of the same number as the axial projections which are formed in the lens holding barrel and disposed at regular angular intervals on a circumference of a circle with the same radius as the circle on the circumference of which the axial projections are disposed, wherein the axial bores are equal in axial depth to one another in a same set and different in axial depth by set, and the circles of the locating means are off-centered from one another. The axial projections are fitted into the axial bores of one of the at least two sets, that is selected for axial position adjustment of the plastic lens, of one of the said groups, that is selected for axial alignment of the plastic lens with respect to the lens holding barrel, respectively, so as thereby to place the plastic lens in the appropriate location and join the plastic lens to the lens holding barrel.

In the case where the plastic lens is formed by a multi-molding die having a plurality of molding cavities having different manufacturing errors from one another and ends up having eccentricity depending on to a manufacturing error entailed by the molding cavity used for molding the plastic lens, the groups of locating means are paired up with the molding cavities, respectively, and the circles of the respective groups of locating means are off-centered according to the manufacturing errors of the molding cavities paired with the groups of locating means, respectively.

The locating and joining means may further comprise different reference marks applied to the groups of locating means, respectively, for exclusively identifying them, respectively, and a reference mark applied to the plastic lens which is identical with one of the different reference marks which is applied to the group of locating means paired up with the molding cavity used for molding the plastic lens.

BRIEF DESCRIPTION OF THE DRAWINGS

The foregoing and other objects and features of the present invention will be clearly understood from the following detailed description when reading with reference to the accompanying drawings wherein same parts or mechanisms are denoted by the same reference numerals throughout the drawings and in which.

DETAILED DESCRIPTION OF THE PREFERRED EMBODIMENTS

In the following description, parts or means which are not direct importance to the invention and parts or means which are purely of conventional construction will not be described in detail.

Figure 1:
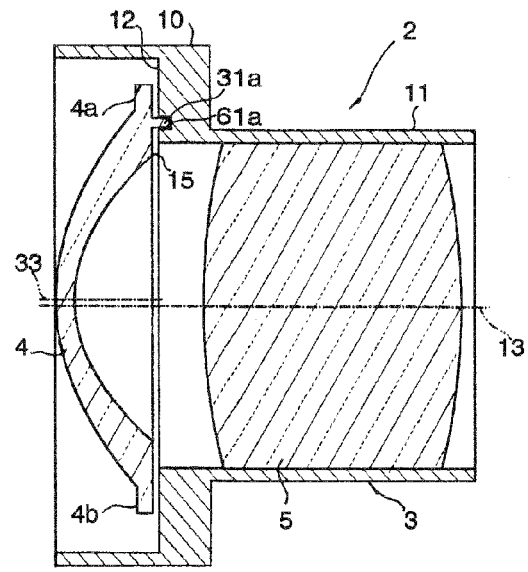
FIG. 1 is a longitudinal sectional view of a lens barrel according to an embodiment of the present invention.

Referring to the accompanying drawings in detail, and in particular, to FIG. 1, there is shown a projection lens 2 which comprises a lens holding barrel 3 according to an embodiment of the present invention and a projection lens system comprising two lens groups, namely a single lens element forming a front or first lens group (which is hereinafter referred to as a front lens) 4 and a rear or second lens group comprising a plurality of lens elements (which is schematically shown by a single block and is hereinafter referred to as a rear lens) 5 are incorporated. The projection lens 2 projects an enlarged image on a remote screen (not shown). The lens holding barrel 3 made as an integral piece comprises a front barrel portion 10 in which the front lens 4 is fixedly incorporated and a rear barrel portion 11, greater in bore diameter then the front barrel portion 10, in which the rear lens 5 is incorporated. An interface between the front barrel portion 10 and the rear barrel portion 11 forms a plane bearing wall 12 perpendicular to a geometric axis 13 of the lens holding barrel 3.

The front lens 4 is made as a meniscus plastic lens having a front convex a spheric surface and a rear concave a spheric surface by injection molding. The front lens 4 comprises a lens body portion 4a and an annular flange portion 4b formed as an integral piece and has a marginal portion 15 having a flat surface at the back thereof which is perpendicular to a geometric axis 33 thereof As will be described in detail later, the front lens 4 is provided with three locating projections 31a (only one of which is shown) extending rearward in an axial direction from the marginal portion 15 and arranged at regular angular intervals on a circumference of a circle with a specified radius, and the lens holding barrel 3 has three groups of locating means, each group of locating means comprising at least two sets of locating bores of the same number as the axial projections, specifically three in this embodiment, (only one of which is shown and designated by a reference numeral 61a). As described later, the front lens 4 incorporated in the front barrel portion 10 is positioned so as to bring not a geometric axis 33 but an optical axis 33 thereof in line with a geometric axis 13 of the lens holding barrel 3.

Figure 2:
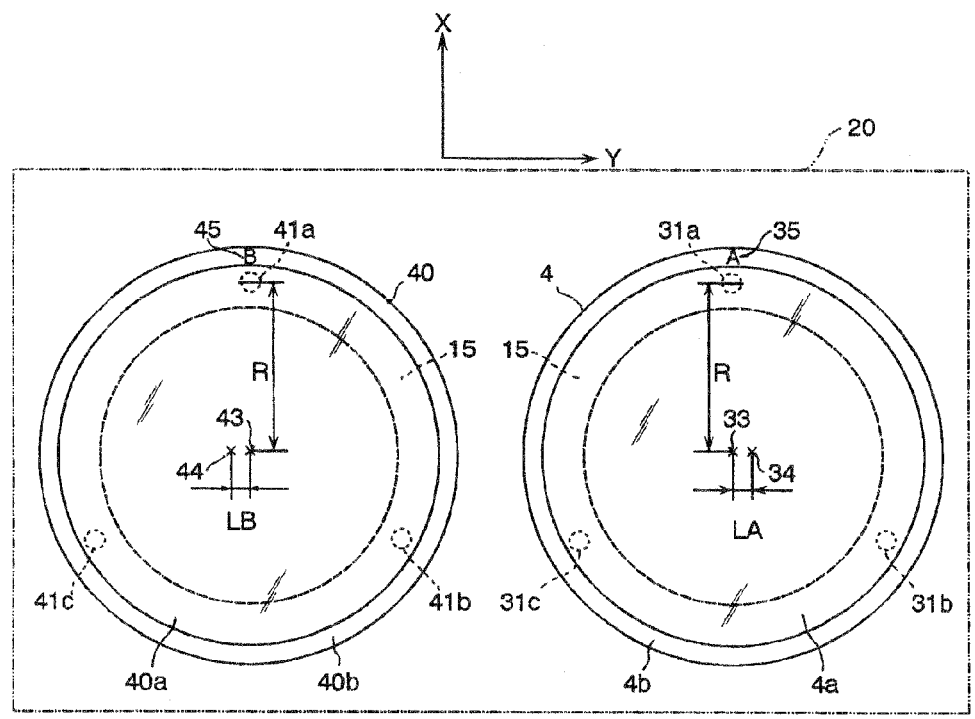
FIG. 2 is an illustration showing plastic lenses molded in a double-cavity molding die.

FIG. 2 shows two plastic lenses, namely a front lens 4 and another front lens 40, which are substantially identical with each other in terms of shape and mechanical dimensions and produced by a double-cavity injection mold 20. The front lens 4 has three axial projections 31a, 31b and 31c, forming a part of locating and joining means, which extend rearward in an axial direction from the marginal surface 15 and have same specified axial lengths L1. These axial projections 31a, 31b and 31c are arranged at regular angular intervals on a circumference of a circle with a specified radius R round the geometric axis 33 of the front lens 4 as a center. In this instance, the front lens 4 ends up having decentering eccentricity LA, i.e. a deviation of an optical axis 34 from the geometric axis 34 thereof, in the event which occurs depending upon an manufacturing error entailed by a molding cavity of the double-cavity injection mold 20 and is hardly avoidable. The front lens 4 is provided with a reference mark 35 such as an alphabetic character "A" on the marginal surface 15 thereof. The reference mark 35 is positioned just above the axial projection 31a that is on a radial line perpendicularly intersecting a straight line through the geometric axis 33 and the optical axis 34 of the front lens 4. When explaining a geometric feature of the front lens 4 by the use of an X-Y coordinate system, the optical axis 34 is decentered from the geometric axis 33 by a deviation (decentered eccentricity) LA in a plus direction of X-axis. The reference mark 35 identify the fact that the front lens 4 is molded in a molding cavity of the double-cavity injection mold 20 at a plus side of X-axis.

Almost similarly to the front lens 4, the front lens 40 has three axial projections 41a, 41b and 41c, forming a part of the locating and joining means, which extend rearward in an axial direction from the marginal surface and having the same specified axial lengths L1 as those of the front lens 4. These axial projections 41a, 41b and 41c are arranged at regular angular intervals on a circumference of a circle with the same radius R as the circle on the circumference of which the axial projections 31a, 31b and 31c are arranged round the geometric axis 43 of the front lens 40. Further, the front lens 40 ends up having decentering eccentricity LB, i.e. a deviation of an optical axis 44 from the geometric axis 43 in the event which occurs depending upon an manufacturing error entailed by a molding cavity of the double-cavity injection mold 20. The front lens 40 is provided with a reference mark 45 such as an alphabetic character "B" on the marginal surface thereof. The reference mark 45 is positioned just above the axial projection 41a that is on a radial line pependicularly intersecting a straight line through the geometric center 43 and the optical center 44 of the front lens 40. In the same X-Y coordinate system, the optical axis 44 is decentered from the geometric axis 43 by a distance LB in a minus direction of X-axis. The reference mark 45 identifies the fact that the front lens 40 is molded in a molding cavity of the double-cavity injection mold 20 at a minus side of X-axis.

Figure 3:
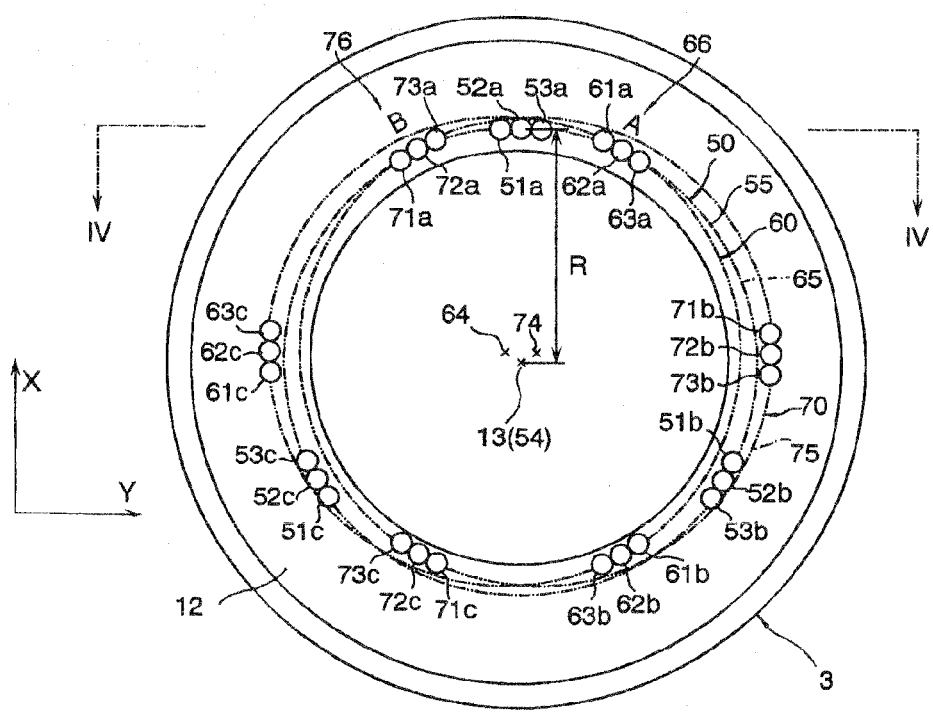
FIG. 3 is a front view of a lens barrel.

Referring to FIG. 3, the lens holding barrel 3 is provided with at least two, specifically three in this embodiment, groups of locating means 50, 60 and 70 forming a part of the locating and joining means, each group of locating means, 50, 60, 70 comprising at least two sets of axial bores of the same number as the axial projections which are arranged at regular angular intervals on a circumference of a circle with the same radius as the circle R as the circle on the circumference of which the axial projections 31a, 31b and 31c are arranged in the bearing wall 12. More specifically, the first group of locating means 50 comprises at least two, specifically three in this embodiment, sets of axial bores, namely a first set of axial bores 51a, 51b and 51c equal in axial depth to one another, a second set of axial bores 52a, 52b and 52c equal in axial depth to one another but less than the first set of axial bores 51a, 51b and 51c; and a third set of axial bores 53a, 53b and 53c equal in axial depth to one another but less than the second set of axial bores 52a, 52b and 52c. The axial bores of each set are arranged at regular angular intervals on a circumference of a circle 55 with the same radius R as the circle on the circumference of which the axial projections 31a, 31b and 31c are arranged. The second group of locating means 60 comprises at least two, specifically three in this embodiment, sets of axial bores, namely a first set of axial bores 61a, 61b and 61c which are equal in axial depth to one another and to the first set of axial bores 51a, 51b and 51c of the first group of locating means 50; a second set of axial bores 62a, 62b and 62c which are equal in axial depth to one another and to the second set of axial bores 52a, 52b and 52c of the first group of locating means 50 but less than the first set of axial bores 61a, 61b and 61c; and a third set of axial bores 63a, 63b and 63c which are equal in axial depth to one another and to the third set of axial bores 53a, 53b and 53c of the first group of locating means 50 but less than the second set of axial bores 62a, 62b and 62c. The axial bores of each set are arranged at regular angular intervals on a circumference of a circle 65 with the same radius R as the circle on the circumference of which the axial projections 31a, 31b and 31c are arranged Similarly, the third group of locating means 70 comprises at least two, specifically three in this embodiment, sets of axial bores, namely a first set of axial bores 71a, 71b and 71c equal in axial depth to one another, a second set of axial bores 72a, 72b and 72c equal in axial depth to one another but less than the first set of axial bores 71a, 71b and 71c; and a third set of axial bores 73a, 73b and 73c equal in axial depth to one another but less than the second set of axial bores 72a, 72b and 72c. The axial bores of each set are arranged at regular angular intervals on a circumference of a circle 75 with the same radius R as the circle on the circumference of which the axial projections 31a, 31b and 31c are arranged.

Further, each group of locating means forms three sets of axial bores different in axial depth from one another which are closely adjacent to one another. The first group of locating means 50 forms a first set of axial bores 51a, 52a and 53a different in axial depth from one another, a second set of axial bores 51b, 52b and 53b different in axial depth from one another, and a third set of axial bores 51c, 52c and 53c different in axial depth from one another. Just the same is true on all other groups of locating means 60 and 70. That is, the second group of locating means 60 forms a first set of axial bores 61a, 62a and 63a different in axial depth from one another, a second set of axial bores 61b, 62b and 63b different in axial depth from one another, and a third set of axial bores 61c, 62c and 63c different in axial depth from one another. Similarly, the third group of locating means 70 forms a first set of axial bores 71a, 72a and 73a different in axial depth from one another, a second set of axial bores 71b, 72b and 73b different in axial depth from one another, and a third set of axial bores 71c, 72c and 73c different in axial depth from one another.

The second and third groups of locating means 60 and 70 are shifted by same angles and decentered by same deviations oppositely in a circumferential direction from the first locating means 50. That is, while the circle 55 of the first group of locating means 50 has a center on the geometric axis 13 of the lens barrel 3b, the circles 65 and 75 of the second and third groups of locating means 60 and 70 have centers 64 and 74, respectively, decentering by same deviations on opposite sides of the geometric axis 13 of the lens barrel 13b, respectively.

Figure 4:
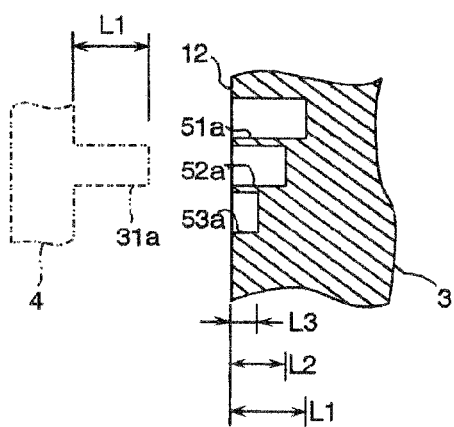
FIG. 4 is a sectional view taken along line IV-IV of FIG. 3 which shows locating means for placing a plastic lens in an appropriate location with respect to a lens holding barrel.

As shown in FIG. 4 by taking the axial bores 51a, 52a and 53a of the first group of locating means 50 as a representative example, the first to third axial bores 51a, 52a and 53a are arranged with small regular separations, or otherwise closely adjacently to one another, in this order. The axial bore 51a has an axial depth L1 equal to the axial length L1 of the first to third axial projection 31a, 31b and 31c of the front lens 4. The axial bore 51b has an axial depth L2 smaller than the first axial bore 51a, and the third axial bore 51c has an axial depth L3 smaller than the second axial bore 51b. In this instance, the first to third axial bores may partly overlap one another so as to form a single circular-arcuate bore with three steps at the bottom which has a radial width almost equal to the diameter of the axial projection 31a, 31b, 31c. In this case, it is essential that the step at a largest depth has a circumferential width at least equal to the diameter of the axial projection 31a, 31b, 31c. However, the remaining steps may have circumferential widths less than the diameter of the axial projection 31a, 31b, 31c. Just the same is true on all other sets of first to third axial bores of the first to third groups of locating means 50, 60 and 70.

The lens holding barrel 3 is provided with reference masks 66 and 76 such as alphabetic characters "A" and "B," respectively, on the bearing wall 12 above the first sets of axial bores 61a, 62a and 63a; and 71a, 72a and 73a, respectively.

Figure 5:
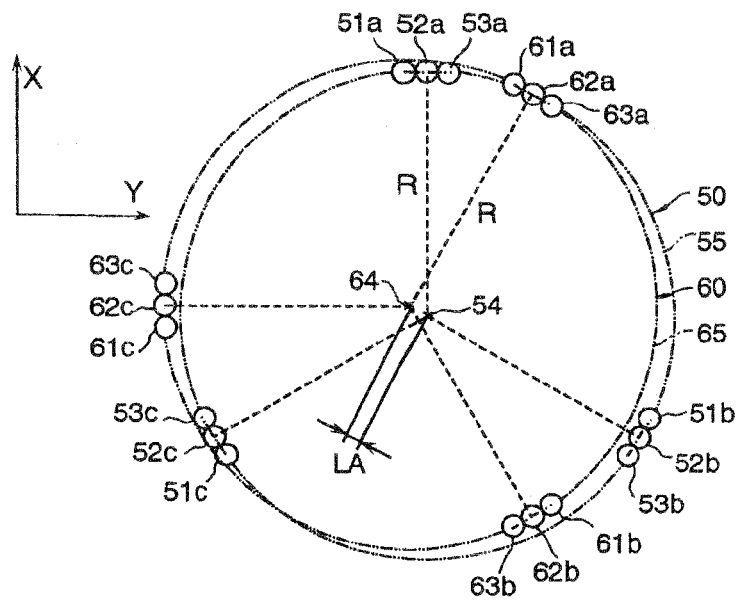
FIG. 5 is an illustration explaining plus side eccentricity of a plastic lens and locating means comprising sets of locating bores for adjusting the plastic lens.

Referring to FIG. 5, the center 64 of the circle 65 for the second group of locating means 60 is on an extension of a straight line through the second axial bore 52b and the center 54 of the circle 55 (the geometric axis 13 of the lens holding barrel 3) for the first group of locating means 50 and on a side opposite to the second axial bore 52b with respect to the center 54 of the circle 55 (the geometric axis 13 of the lens holding barrel 3). As was previously described, the center distance between the circles 55 and 65 is LA.

Figure 6:
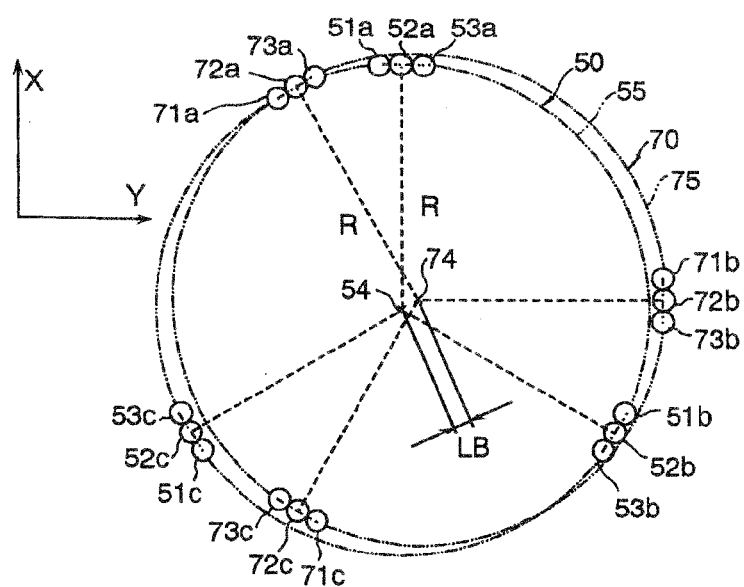
FIG. 6 is an illustration explaining minus side eccentricity of a plastic lens and locating means comprising sets of locating bores for adjusting the plastic lens.

Referring to FIGS. 5 and 6, the second and third groups of locating means 60 and 70 are shifted 30° oppositely in a circumferential direction from the first group of locating means 50. Specifically, as shown in FIG. 5, the first to third sets of axial bores 61a, 62a and 63a; 61b, 62b and 63b; and 61c, 62c and 63c of the second group of locating means 60 are shifted 30° in a clockwise direction from the first to third sets of axial bores 51a, 52a and 53a; 51b, 52b and 53b; and 51c, 52c and 53c of the first group of locating means 50, respectively. In this arrangement, the straight line through the axial bore 62a of the first set of the second group of locating means 60 intersects a straight line through the center 64 of the circle 65 for the second group of locating means 60 and the center 54 of the circle 55 for the first group of locating means 50 (the geometric center 13 of the lens holding barrel 3), and the front lens 4 has the axial projection 31a positioned on a radial line perpendicular to a straight line through the geometric axis 33 and the optical axis 34 (see FIG. 2). In consequence, when incorporating the front lens 4 in the lens holding barrel 3, it is ensured to bring the optical axis 34 of the front lens 4 into substantial alignment with the geometric axis 13 of the lens holding barrel 3 by fitting the axial projections 31a marked with "A" (reference mark 35) in one of the first set of axial bores identically marked with "A" (reference mark 35), of the second group of locating means 60, that is selected according to an axial distance required for the front lens 4 with respect to the rear lens 5.

Further, as shown in FIG. 6, the first to third sets of axial bores 71a, 72a and 73a; 71b, 72b and 73b; and 71c, 72c and 73c of the third group of locating means 70 are shifted 30° in a counterclockwise direction from the first to third sets of axial bores 51a, 52a and 53a; 51b, 52b and 53b; and 51c, 52c and 53c of the first group of locating means 50, respectively. Similarly to the second group of locating means 60, the straight line through the axial bore 72a of the first set of the third group of locating means 70 intersects a straight line through the center 74 of the circle 75 for the third group of locating means 70 and the center 54 of the circle 55 for the first group of locating means 50 (the geometric center 13 of the lens holding barrel 3), and the front lens 40 has the axial projection 31a positioned on a radial line perpendicular to a straight line through the geometric axis 33 and the optical axis 34 (see FIG. 2). In consequence, when incorporating the front lens 40 in the lens holding barrel 3b, it is ensured to bring the optical axis 44 of the front lens 40 into substantial alignment with the geometric axis 13 of the lens holding barrel 3 by fitting the first axial projections 41a marked with "B" (reference mark 35) in one of the first set of axial bores marked with "B" (reference mark 45) of the third group of locating means 60, that is selected according to an axial distance required for the front lens 40 with respect to the rear lens 5.

In assembling work, when incorporating the front lens 4 having decentering eccentricity LA (a deviation of the optical axis 34 from the geometric axis 34), the front lens 4 is picked up so that the reference mark (A) 35 of the front lens 4 is placed oppositely to the reference mark (A) 66 of the lens holding barrel 3. Then, the front lens 4 is incorporated into the lens holding barrel 3 by fitting the first axial projection 31a marked with "A" into one of the first set of axial bores marked with "A" (reference mark 66), i.e. the first set of axial bores 61a, 62a and 63a of the second group of locating means 60, selected suitably for a desired axial distance between the front lens 4 and the rear lens 5 and simultaneously fitting the remaining axial projections 31b and 31c in ones of the second and third sets of axial bores 61b, 62b and 63b; and 61c, 62c and 63c corresponding to the selected one of the first set of axial bores 61a, 62a and 63a, respectively. The front lens 4 thus incorporated is located in a suitable position where the optical axis 34 of the front lens 4 is in substantially alignment with the geometric axis 13 of the lens holding barrel 3.

Similarly, when incorporating the front lens 40 having decentering eccentricity LB (a deviation of the optical axis 44 from the geometric axis 43), the front lens 40 is picked up so that the reference mark (B) 45 of the front lens 40 is placed oppositely to the reference mark (B) 76 of the lens holding barrel 3. Then, the front lens 40 is incorporated into the lens holding barrel 3 by fitting the first axial projection 41a marked with "B" into one of the first set of axial bores marked with "B" (reference mark 76), i.e. the first set of axial bores 71a, 72a and 73a of the third group of locating means 70, selected suitably for a desired axial distance between the front lens 40 and the rear lens 5 and simultaneously fitting the remaining axial projections 31b and 31c in ones of the second and third sets of axial bores 71b, 72b and 73b; and 71c, 72c and 73c corresponding to the selected one of the first set of axial bores 71a, 72a and 73a, respectively. The front lens 40 thus incorporated is located in a suitable position where the optical axis 44 of the front lens 40 is in substantially alignment with the geometric axis 13 of the lens holding barrel 3.

As just described, the front lens, the front lens 4 having an optical axis decentered from a geometric axis by a distance LA or the front lens 40 having an optical axis decentered from a geometric axis by a distance LB, is easily adjusted in both centricity and axial position by selectively coupling the axial projections to appropriate ones of the respective sets of axial bores. Furthermore, since the front lens is stably combined with the lens holding barrel 3 by virtue of three-point coupling between them, it is not necessary for the front lens to be fixed to the lens barrel with an adhesive. This allows the front lens to be removed from the lens barrel and reincorporated in the same or another lens barrel.

Figure 7:
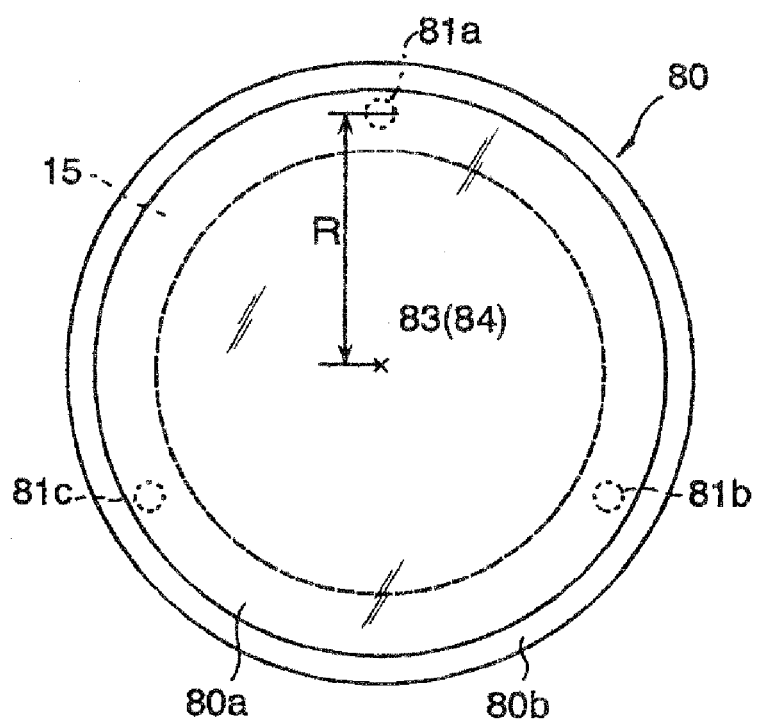
FIG. 7 is an illustration showing an ideal plastic lens which has no eccentricity.

FIG. 7 shows a front lens 80 which is substantially identical with the front lens 4 in terms of shape and mechanical dimensions and has an optical axis 84 substantially coaxial with a geometric axis 83. The front lens 80 comprises a lens body portion 80a and an annular flange portion 80b formed as an integral piece and has a marginal portion having a flat surface at the back thereof which is perpendicular to the geometric and optical axis 83 and 84. The front lens 80 is provided with three axial projections 81a, 81b and 81c extending rearward in an axial direction from the marginal surface and having the same specified axial lengths L1 as those of the front lens 4 or 40. These axial projections 81a, 81b and 81c are arranged at regular angular intervals on a circumference of a circle with the same radius R as the circle on the circumference of which the axial projections 31a, 31b and 31c are arranged round the geometric axis 43 of the front lens 40 round the geometric and optical axes 83 and 84 of the front lens 80.

The front lens 80 is incorporated in the lens barrel 3 by fitting any one of the axial projections 81a, 81b and 81c into ones of the three sets of axial bores 51a, 52a and 53a; 51b, 52b and 53b; and 51c, 52c and 53c of the first group of locating means 50 selected suitably for a desired axial distance between the front lens 80 and the rear lens 5, not necessarily in this order. The front lens 80 thus incorporated is located in a location where the optical axis 84 of the front lens 80 is brought into alignment with the geometric axis 13 of the lens barrel 3.

Although, in the above embodiment, the locating and joining means comprises three groups of locating means each of which comprises three sets of axial bores and axial projections, the locating and joining means comprises two or more than three groups of locating means and/or each group of locating means may comprise two or more than three sets of axial bores.

Although the above description has been directed to a lens barrel for a projection lens, the present invention is applied to various lens barrels such as a lens barrel for a taking lens of a camera.

What is claimed is:

1. A lens barrel for holding an optical lens system including a plastic lens formed by molding therein, said plastic lens ending up having decentering eccentricity of an optical axis from a geometric axis thereof due to a manufacturing error entailed by a molding die used for said plastic lens, said lens barrel comprising:

a lens holding barrel for fixedly holding said plastic lens therein; and locating and joining means for placing said plastic lens in a location where said plastic lens is in a desired axial position and an optical axis of said plastic lens is coaxial with a geometric axis of said lens holding barrel and fixedly joining said plastic lens to said lens holding barrel in said location;

said locating and joining means comprising:

at least three axial projections of predetermined equal axial length which extend in an axial direction from a marginal portion of said plastic lens and are disposed at regular angular intervals on a circumference of a circle with a specified radius; and at least two groups of locating means comprising axial bores for receiving said axial projections respectively, each said group of locating means comprising at least two sets of said axial bores of the same number as said axial projections which are formed in said lens holding barrel and disposed at regular angular intervals on a circumference of a circle with the same radius as said circle on said circumference of which said axial projections are disposed;

wherein said axial bores are equal in axial depth to one another in a same set and different in axial depth by set, and said circles of said locating means are off-centered from one another; and wherein said axial projections are fitted in said axial bores of one of said at least two sets selected for axial position adjustment of said plastic lens of one of said groups selected for coaxial adjustment of said plastic lens, respectively, so as thereby to place said plastic lens in said location and join said plastic lens to said lens holding barrel.

2. A lens barrel as defined in claim 1, wherein, in the case where said plastic lens is formed by a multi-molding die having a plurality of molding cavities having different manufacturing errors from one another and ends up having decentering eccentricity of an optical axis from a geometric axis thereof according to said manufacturing error entailed by said molding cavity used for said plastic lens, said groups of locating means are paired up with said molding cavities, respectively, and said circles of said groups of locating means are off-centered according to said manufacturing errors of said molding cavities paired with said groups of locating means, respectively.

3. A lens barrel as defined in claim 2, wherein said locating and joining means further comprises identical reference marks applied to said plastic leans and said group of locating means paired up with said molding cavity used for said plastic lens, respectively, said reference mark exclusively representing said molding cavity used for said plastic lens.

4. A lens barrel as defined in claim 3, wherein said locating and joining means comprises three said groups of locating means each of which comprises three said sets of axial bores.

* * * * *